United States Patent [19]

Wienke et al.

[11] Patent Number: 4,768,543

[45] Date of Patent: Sep. 6, 1988

[54] VALVE FOR A GAS VESSEL

[75] Inventors: Volker Wienke; Heinrich Scheel, both of Lübeck, Fed. Rep. of Germany

[73] Assignee: Drägerwerk Aktiengesellschaft, Lübeck, Fed. Rep. of Germany

[21] Appl. No.: 68,898

[22] Filed: Jun. 30, 1987

[30] Foreign Application Priority Data

Jul. 4, 1986 [DE] Fed. Rep. of Germany ....... 3622527

[51] Int. Cl.[4] ............................................. F16K 51/00
[52] U.S. Cl. ..................................... 137/240; 137/606
[58] Field of Search ................................ 137/240, 606

[56] References Cited

U.S. PATENT DOCUMENTS

| 3,572,366 | 3/1971 | Wiggins | 137/240 |
| 4.008,736 | 2/1977 | Wittmann-Liebold et al. | 137/606 |
| 4,217,931 | 8/1980 | Jackel | 137/606 |
| 4,281,683 | 8/1981 | Hetherington et al. | 137/606 |
| 4,497,334 | 2/1985 | Wolf et al. | 137/240 X |
| 4,558,845 | 12/1985 | Hunkapiller | 137/606 X |

Primary Examiner—Martin P. Schwadron
Assistant Examiner—Stephen M. Hepperle
Attorney, Agent, or Firm—Walter Ottesen

[57] ABSTRACT

A valve for a gas vessel has a gas-pressure line which leads to a valve chamber and which is closed by means of a closure valve disposed in the valve chamber. The valve for a gas vessel also includes a gas-takeoff line and is configured so that the valve chamber and the gas-takeoff line as well as other gas conducting spaces at the output end of the valve can be purged in the operational ready condition of the valve. The application and removal of the purging flow occurs over different paths and the purging takes place independently of the actuation of the closure valve. For this purpose, a purging line which is equipped with a purging valve is provided. The purging line opens in the valve chamber of the closure valve.

5 Claims, 1 Drawing Sheet

U.S. Patent  Sep. 6, 1988  4,768,543
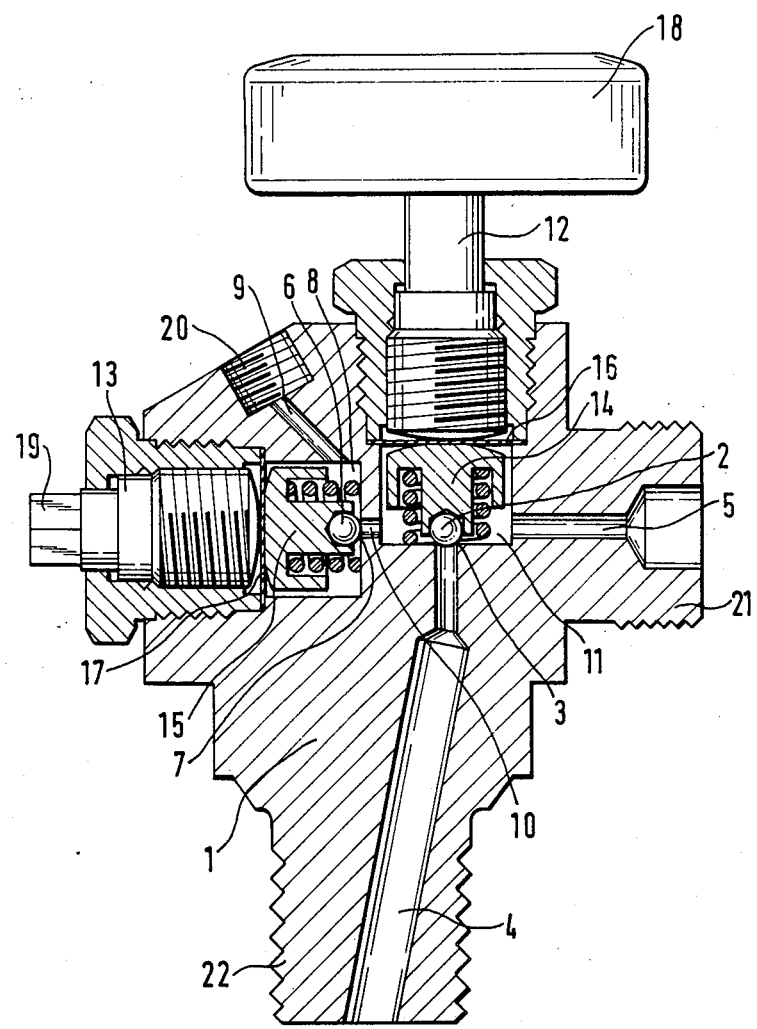

VALVE FOR A GAS VESSEL

FIELD OF THE INVENTION

The invention relates to a valve for a gas vessel which includes a gas-pressure line leading to a valve chamber. The gas-pressure line is shut off by means of a closure valve. The valve also has a gas-takeoff line.

BACKGROUND OF THE INVENTION

Conventional valves for gas vessels are little suited for situations wherein gas of the highest purity is required for manufacturing purposes such as, for example, in the manufacture of semiconductors. The utilization of the superpure gas does not permit any contamination by even the smallest quantity which could be present in the valve chamber or the gas-takeoff line of these valves. Furthermore, special superpure gases are incompatible with air and can be corrosive or toxic. For example, silane explodes when it comes into contact with residual air in the valve chamber. Toxic gases would endanger working personnel.

After interrupting or opening the gas-conducting system, the equipment can be first made inert when starting again by purging all output supply lines with a suitable gas via a separate purging circuit. However, the closure valve remains inadequately purged by this purging operation because it is not arranged in the direct purging flow; instead, the closure valve is accessible only through the gas-takeoff line because the gas supply is located at the inlet end. To purge blind spaces of the closure valve itself, separate manipulations are necessary such as interval purgings which are costly and the result is uncertain and, in addition, the gas-takeoff line must be separated from the remaining consumer lines. The impurities which remain do not then correspond to the high requirements which are imposed on the superpure gas atmosphere.

German Pat. No. 667,378 discloses a valve for closing high-pressure gas vessels while at the same time functioning as a venting valve for gas-takeoff lines. A closure bolt alternately opens and closes a high-pressure valve as well as a ventilating valve. When the high-pressure valve is open, the gas flows out from the vessel into the gas-takeoff lines to a consumer. If the vessel is to be closed, the closure bolt is pressed against the high-pressure valve while at the same time clearing the ventilating valve. The overpressure present in the valve chamber and in the gas-takeoff line can escape into the ambient via the opened ventilating valve.

This known valve is not suitable for superpure gases because for each interruption in operation and closure of the high-pressure valve, the valve chamber and the gas-takeoff line are brought into communication with the ambient via the ventilating valve so that a contamination is again present from the ambient. A further undesirable condition is present in that the gas supply is connected with the ambient during the transition phase during opening and closing because the high-pressure and ventilating valves are open at the same time.

SUMMARY OF THE INVENTION

It is an object of the invention to provide a valve of the above-mentioned type which, in its operational-ready condition, can be purged in its valve chamber and gas-takeoff lines as well as other gas conducting output chambers up to the valve seat. The incoming and outgoing purging flow follows different paths and the purging can occur independently of the actuation of the closure valve.

According to a feature of the invention, a purging line is provided which is equipped with a purging valve and which opens into the valve chamber.

The inert gas can be brought into the gas-takeoff line through the valve chamber via the purging line when the closure valve is closed so that a through purging of the entire gas conducting system up to the particular connection for the consumer can be carried out. In this way, also such contamination can be completely driven out which are caught in the valve chamber and especially around the valve seat.

An especially advantageous embodiment of the invention is provided by building the purging valve into the valve body and the purging line so that it passes through the purging-valve chamber. In this way, the dead-space volume remaining behind the purging-valve is significantly reduced than would be the case if the purging valve were connected at any particular location within the purging line.

To further reduce the remaining dead-space volume, the opening of the purging line can be configured as a through-pass channel of the purging-valve seat so that the purging valve and the valve chamber of the closure valve can be mounted directly next to each other. The length of the pass-through channel is then determined only by the needed wall thickness of the valve chamber.

The configuration of the valve assembly according to the invention permits purging with the use gas as well as a purging with inert gases without danger. This makes it possible, for example, to establish a non-dangerous ambient when utilizing very poisonous and offensive gases before and after exchanging the gas vessel. In the last-mentioned situation, the required purity of the use gas is obtained after a short flow thereof because the deadspaces such as the through-pass channel are kept as small as possible.

A further advantageous configuration for the opening of the purge line is provided in that it terminates in the valve chamber diametrically opposite the gas-takeoff line. In this way, even the smallest spaces within the valve chamber are effectively purged in the through-flow step.

BRIEF DESCRIPTION OF THE DRAWING

The invention will now be described with the respect to the single FIGURE of the drawing which is a side elevation view, partially in section, of the valve according to the invention.

DESCRIPTION OF THE PREFERRED EMBODIMENTS OF THE INVENTION

Referring to the drawing, a closure valve (2, 3) is mounted in a valve body 1 between a gas-pressure line 4 and a gas-takeoff line 5. In addition, a purging valve (6, 7) is disposed in the valve body 1 and has a purging valve chamber 8 into which a purging line 9 leads. The purging valve seat 7 serves at the same time as the opening for a through-pass channel 10 which ends as an opening of the purging line 9 in the valve chamber 11 of the closure valve (2, 3).

Both valves are configured as ball valves whose valve balls 2 and 6 are pressed against corresponding ones of valve seats 3 and 7 when in the closed condition. The closure valve (2, 3) as well as the purging valve (6, 7) are actuable by means of respective closure spindles 12 and 13 via respective valve bodies 14 and 15. Membranes 16 and 17 provide appropriate gas seals. The closure spindle 12 is rotated via a hand wheel 18 and the purge spindle 13 can be rotated via the square-shank drive 19, for example, with the aid of a drive socket or wrench (not shown).

The purge line 9 can be connected to a purge gas supply (not shown) via a purge connection 20. The gas-takeoff line 5 is provided with a valve side connection to which a consumer can be connected. The connection of the valve body 1 to the gas vessel (not shown) is made with a threaded stud 22.

For purging the valve, the purging valve (6, 7) is opened with the closure valve (2, 3) closed so that the purging gas can pass out from the purging line 9 into the purging valve chamber 8 and from there through the through-pass channel 10 into the valve chamber 11 and out of the gas-takeoff line 5 to the supply connection 21. The necessary duration of purging can be determined by detecting the purity of the gas by means of a suitable control in the gas-takeoff line so that the purging valve (6, 7) can again be closed when the desired gas quality is attained. By opening the closure valve (2, 3), the use gas can now be directed into the gas-takeoff line 5 via the gas-pressure line 4.

It is understood that the foregoing description is that of the preferred embodiments of the invention and that various changes and modifications may be made thereto without departing from the spirit and scope of the invention as defined in the appended claims.

What is claimed is:

1. A valve for a gas source containing gas under pressure, the valve comprising:
    a valve housing having a closure valve chamber formed therein;
    a gas-pressure line formed in said valve housing for conducting use gas from the gas vessel into said valve chamber;
    a gas-takeoff line communicating directly with said chamber for directing gas away from said closure valve chamber and said valve housing;
    closure valve means for interrupting the flow of the use gas from said gas-pressure line, said closure valve means including: valve seat means on a wall of said chamber; a valve closure body mounted inside of said chamber so as to be movable between a first position inside of said chamber wherein said gas-pressure line communicates with said chamber to permit use gas to flow into said chamber and to said gas-takeoff line and a second position also inside of said chamber wherein said valve closure body is in sealing contact engagement with said valve seat means and the flow of use gas into said valve chamber is interrupted; and, actuator means for acting on said valve body at a location thereon facing away from said valve seat means to move said valve body from said first position to said second position;
    a purging gas conduit for conducting purging gas into said closure valve chamber, said purging gas conduit being in permanent communication with said gas-takeoff line via said chamber independently of said positions of said closure valve body thereby permitting the purging gas to pass directly through said valve chamber to said gas-takeoff line thereby throughly purging said chamber and the region of said valve means; and,
    purging valve means for passing and interrupting the flow of purging gas to said closure valve chamber via said purging gas conduit.

2. The valve of claim 1, said purging gas conduit being formed in said valve housing; said valve housing having a purging valve chamber formed therein so as to be serially connected into said purging gas conduit; and, said purging valve means being mounted in said purging gas valve chamber.

3. The valve of claim 2, said purging valve means comprising a valve seat formed in a wall of said purging valve chamber; said purging valve chamber being disposed directly adjacent said closure valve chamber so as to cause a short segment of said purging gas conduit to extend between said valve seat and said closure valve chamber, said short segment being a through-pass channel and defining the opening of said purging gas conduit into said closure valve chamber.

4. The valve of claim 3, said opening being disposed diametrically opposite said gas-takeoff line.

5. The valve of claim 1 wherein said gas source is a gas vessel holding the use gas under pressure, said value housing having means formed thereon for attaching the valve to the gas vessel.

* * * * *

UNITED STATES PATENT AND TRADEMARK OFFICE
CERTIFICATE OF CORRECTION

PATENT NO. : 4,768,543

DATED : September 6, 1988

INVENTOR(S) : Volker Wienke and Heinrich Scheel

It is certified that error appears in the above-identified patent and that said Letters Patent is hereby corrected as shown below:

In column 4, line 20: delete "throughly" and substitute -- thoroughly -- therefor.

In column 4, line 43: delete "value" and substitute -- valve -- therefor.

Signed and Sealed this

Thirteenth Day of June, 1989

*Attest:*

DONALD J. QUIGG

*Attesting Officer*   *Commissioner of Patents and Trademarks*